(12) United States Patent
Kakeshita et al.

(10) Patent No.: US 11,618,382 B2
(45) Date of Patent: Apr. 4, 2023

(54) ALERT APPARATUS

(71) Applicant: TOYOTA JIDOSHA KABUSHIKI KAISHA, Toyota (JP)

(72) Inventors: Mafune Kakeshita, Toyota (JP); Chen Xi, Nagoya (JP); Tsunekazu Yasoshima, Nagoya (JP); Kenichi Shimizu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/667,966

(22) Filed: Feb. 9, 2022

(65) Prior Publication Data
US 2022/0258666 A1 Aug. 18, 2022

(30) Foreign Application Priority Data
Feb. 12, 2021 (JP) .............................. JP2021-020892

(51) Int. Cl.
*B60Q 9/00* (2006.01)
*G08G 1/16* (2006.01)

(52) U.S. Cl.
CPC ............. *B60Q 9/008* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 8,605,947 B2* | 12/2013 | Zhang | .................... | G08G 1/167 348/148 |
| 9,889,798 B1* | 2/2018 | Cong | ..................... | G01S 13/66 |
| 10,940,797 B2* | 3/2021 | Ito | ........................... | B60R 99/00 |
| 2010/0271238 A1* | 10/2010 | Reed | ..................... | G01S 13/931 340/932.2 |
| 2010/0283632 A1* | 11/2010 | Kawabata | ............. | G08G 1/165 340/932.2 |
| 2011/0175714 A1* | 7/2011 | Kobayashi | ...... | B60W 30/18036 701/70 |
| 2013/0033371 A1* | 2/2013 | Schliemann | ........... | G08G 1/165 340/435 |
| 2013/0286205 A1* | 10/2013 | Okada | ..................... | G06V 20/58 348/148 |
| 2014/0044311 A1* | 2/2014 | Takahashi | ............. | G06V 20/588 382/103 |
| 2015/0015714 A1* | 1/2015 | Gokan | .................. | B60W 50/14 348/148 |

(Continued)

FOREIGN PATENT DOCUMENTS

JP 2004-280453 A 10/2004

*Primary Examiner* — Muhammad Adnan
(74) *Attorney, Agent, or Firm* — Sughrue Mion, PLLC

(57) ABSTRACT

An alert apparatus sets a determination area which is at a turning direction side of an own vehicle with respect to a longitudinal direction line of the own vehicle and extends forward from the own vehicle or from near the own vehicle when an angle condition that a moving direction angle corresponding to an angle defined by a longitudinal direction line of the own vehicle and a moving direction of an approaching vehicle is within a predetermined angle range, is satisfied. The alert apparatus sets the determination area which is at the turning direction side of the longitudinal direction line and away forward from the own vehicle by a predetermined distance when the angle condition is not satisfied.

2 Claims, 18 Drawing Sheets

(56) References Cited

U.S. PATENT DOCUMENTS

| | | | |
|---|---|---|---|
| 2015/0057918 A1* | 2/2015 | Sugano | B60T 7/22 |
| | | | 701/301 |
| 2018/0099665 A1* | 4/2018 | You | G01S 13/931 |
| 2018/0197020 A1* | 7/2018 | Gomezcaballero | G06V 20/64 |
| 2018/0211536 A1* | 7/2018 | Akamine | G08G 1/166 |
| 2019/0271777 A1* | 9/2019 | Hiromitsu | G01S 13/931 |
| 2019/0275993 A1* | 9/2019 | Hiromitsu | B60Q 9/008 |
| 2020/0074860 A1* | 3/2020 | Kitaura | G08G 1/16 |
| 2020/0180507 A1* | 6/2020 | Katou | B60Q 9/008 |
| 2020/0193830 A1* | 6/2020 | Kim | G08G 1/166 |
| 2020/0372802 A1* | 11/2020 | Kim | G01S 15/931 |
| 2021/0171026 A1* | 6/2021 | Pfau | G08G 1/166 |
| 2022/0189293 A1* | 6/2022 | Kang | G08G 1/167 |
| 2022/0227359 A1* | 7/2022 | Shimizu | B60W 10/20 |
| 2022/0297600 A1* | 9/2022 | Kawahara | G08G 1/166 |

* cited by examiner

ALERT APPARATUS

BACKGROUND

Field

The invention relates to an alert apparatus configured to execute an alert control.

Description of the Related Art

There is known an alert apparatus which is configured to detect a moving object approaching an own vehicle and inform a driver of the own vehicle of the moving object approaching the own vehicle to alert the driver (for example, see JP 2004-280453 A).

Hereinafter, vehicles are regulated to keep to the left side of a road. The known apparatus described in JP 2004-280453 A determines whether the own vehicle turning right at a traffic intersection has a probability of colliding with another vehicle such as an oncoming vehicle. When the known apparatus determines that the own vehicle turning right at the traffic intersection has the probability of colliding with the other vehicle, the known apparatus executes an alert control. For example, the alert control is a control of outputting an alert sound by a buzzer and displaying an alert mark on a display device.

There is a complicated traffic intersection. In this regard, for example, when the other vehicle approaches the own vehicle at the complicated traffic intersection at which three roads cross not perpendicular to each other, the other vehicle does not cross a moving path of the own vehicle in some cases. When the other vehicle does not cross the moving path of the own vehicle, the own vehicle does not collide with the other vehicle. Thus, alerting the driver should not be carried out. However, the known apparatus is not configured to consider a right turning of the own vehicle at the complicated traffic intersection. Thus, although alerting the driver should not be carried out, the known apparatus may execute the alert control. If the alert control is executed when alerting the driver should not be carried out, the driver may feel bothersome.

SUMMARY

An object of the invention is to provide an alert apparatus which can execute the alert control in an appropriate situation that the own vehicle has the probability of colliding with the other vehicle when the own vehicle turns right or left at the traffic intersection.

According to the invention, an alert apparatus comprises at least one sensor and an electronic control unit. The at least one sensor which acquires object information on objects in a surrounding area around an own vehicle. The surrounding area includes a forward area ahead of the own vehicle. The electronic control unit is configured to select another vehicle as an approaching vehicle, based on the object information when the own vehicle turns at a traffic intersection. The other vehicle is a vehicle which is in the surrounding area and moves toward the own vehicle. Further, the electronic control unit is configured to execute an alert control of alerting a driver of the own vehicle about an oncoming vehicle which has a probability of colliding with the own vehicle when the electronic control unit determines that the approaching vehicle is the oncoming vehicle which has the probability of colliding with the own vehicle.

Further, the electronic control unit is configured to set a determination area used to determine whether the approaching vehicle is the oncoming vehicle. Furthermore, the electronic control unit is configured to determine that the approaching vehicle is the oncoming vehicle when any one of (i) a first condition that a particular position of the approaching vehicle is in the determination area and (ii) a second condition that a predicted moving route of the approaching vehicle crosses the determination area, is satisfied.

Further, the electronic control unit is configured to set the determination area such that the determination area is at a turning direction side of the own vehicle with respect to a longitudinal direction line of the own vehicle and extends forward from the own vehicle or from near the own vehicle when an angle condition that a moving direction angle corresponding to an angle defined by the longitudinal direction line of the own vehicle and a moving direction of the approaching vehicle is within a predetermined angle range, is satisfied. Furthermore, the electronic control unit is configured to set the determination area such that the determination area is at the turning direction side of the longitudinal direction line and away forward from the own vehicle by a predetermined distance when the angle condition is not satisfied.

The alert apparatus configured according to the invention sets the determination area such that the determination area extends forward from the own vehicle or from near the own vehicle when the angle condition becomes satisfied. Thereby, any one of the first condition and the second condition is satisfied with regard to the oncoming vehicle which has the probability of colliding with the own vehicle. Thus, the alert apparatus according to the invention can execute the alert control in the appropriate situation.

On the other hand, when the angle condition is not satisfied, the own vehicle may be turning at the complicated traffic intersection. Thus, the approaching vehicle has the low probability of colliding with the own vehicle. In this situation, the alert apparatus according to the invention sets the determination area such that the determination area is away forward from the own vehicle by the predetermined distance. Thereby, the first condition and the second condition are unlikely to be satisfied with regard to the approaching vehicle. Thereby, the alert apparatus according to the invention can reduce a probability of determining that the approaching vehicle having the low probability of colliding with the own vehicle is the oncoming vehicle. Thus, the alert apparatus according to the invention can reduce a probability of executing the alert control in an unnecessary situation that the alert control should not be executed.

According to an aspect of the invention, the electronic control unit may be configured to determine that the angle condition is satisfied when the moving direction angle is within a first angle range in a first situation that the approaching vehicle is at the opposite side to the turning direction side of the own vehicle with respect to the longitudinal direction line of the own vehicle. In this aspect, the electronic control unit may be configured to determine that the angle condition is satisfied when the moving direction angle is within a second angle range in a second situation that the approaching vehicle is at the turning direction side of the own vehicle with respect to the longitudinal direction line of the own vehicle. Further, in this aspect, the first angle range may be greater than the second angle range.

In the first situation, the moving direction angle of the approaching vehicle having the probability of colliding with the own vehicle considerably varies, depending on a turning degree of the own vehicle. On the other hand, in the second situation, a range of the moving direction angle of the approaching vehicle having the probability of colliding with the own vehicle is small. Accordingly; the first angle range is set to a range greater than the second angle range. Thereby, the alert apparatus according to the invention can accurately determine whether the approaching vehicle is the oncoming vehicle having the probability of colliding with the own vehicle.

According to one or more embodiments, the electronic control unit may be realized by a micro-processor programmed to realize one or more functions described in the description of this application. Further, according to one or more embodiments, the electronic control unit may be entirely or partially realized by hardware configured by integrated circuit such as ASIC dedicated to one or more applications.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Below, one or more embodiments of the invention will be described with reference to the drawings. The drawings show specific embodiments but do not limit a technical scope of the invention.

Figure 1:
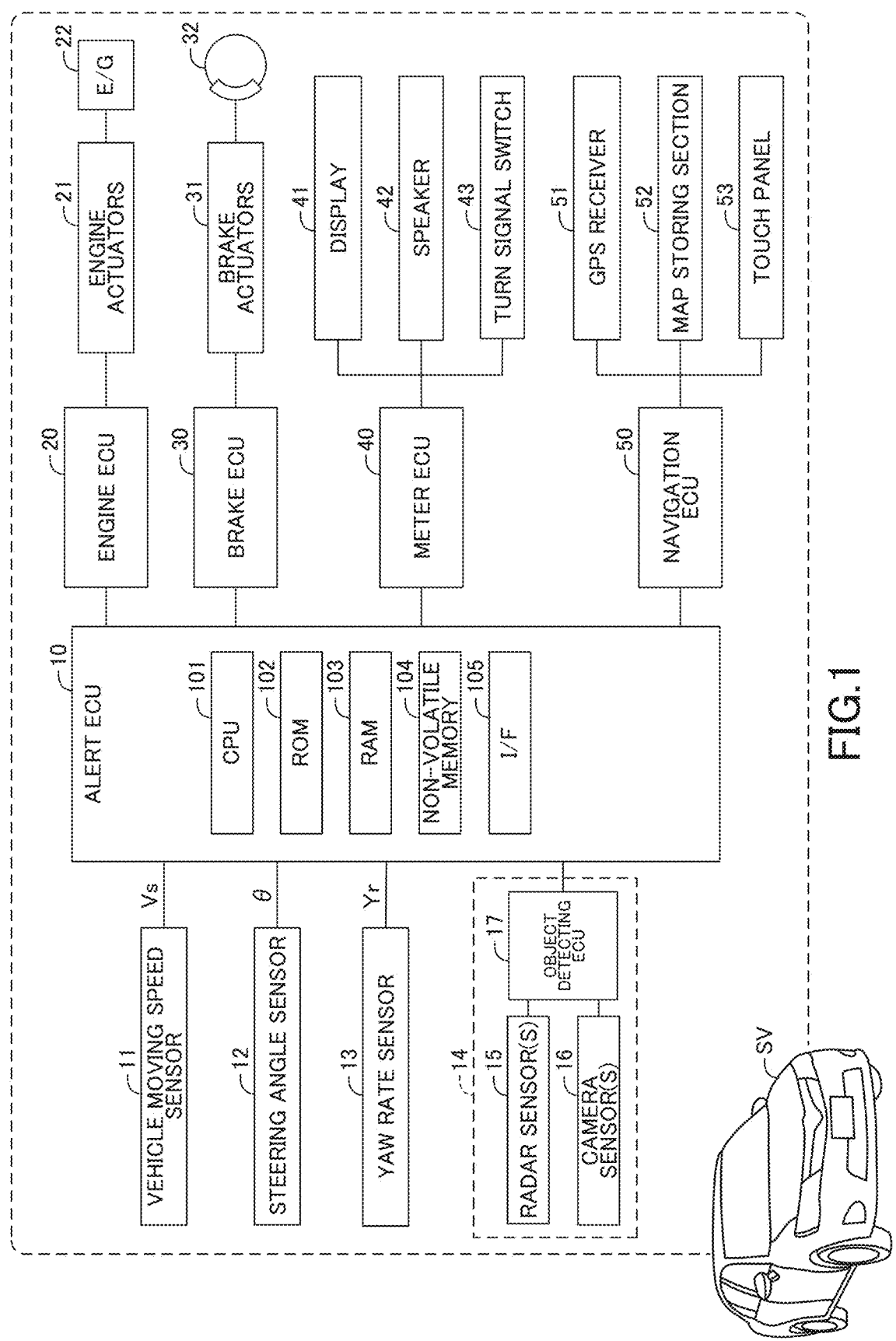
FIG. 1 is a general configuration view which shows an alert apparatus according to a first embodiment of the invention.

As shown in FIG. 1, an alert apparatus according to an embodiment of the invention is applied to a vehicle SV. The vehicle SV will be also referred to as "own vehicle SV" for distinguishing the own vehicle SV from other vehicles.

The alert apparatus includes an alert ECU 10, an engine ECU 20, a brake ECU 30, a meter ECU 40, and a navigation ECU 50. Some or all of the ECUs 10, 20, 30, 40, and 50 may be integrated into one ECU. Hereinafter, the alert ECU 10 will be simply referred to as "ECU 10".

Each of the ECUs 10, 20, 30, 40, and 50 is an electronic control unit which includes a micro-computer as a main component. The ECUs 10, 20, 30, 40, and 50 are electrically connected to send and receive information to and from each other via a CAN (Controller Area Network) not shown.

The micro-computer includes a CPU, a ROM, a RAM, a non-volatile memory, and an interface I/F. For example, the ECU 10 includes a micro-computer which includes a CPU 101, a ROM 102, a RAM 103, a non-volatile memory 104, and an interface (I/F) 105. The CPU 101 is configured or programmed to realize various functions by executing instructions, or programs, or routines memorized in the ROM 102.

The ECU 10 is electrically connected to sensors described below. The ECU 10 is configured to receive detection signals or output signals output from the sensors. It should be rioted that each sensor may be electrically connected to one of the ECUs 20, 30, 40, and 50 other than the ECU 10, In this case, the ECU 10 receives the detection signals or the output signals of the sensors from the ECU to which the sensor is electrically connected via the CAN.

A vehicle moving speed sensor 11 detects a moving speed Vs of the own vehicle SV. The vehicle moving speed sensor 11 outputs a signal which represents the detected moving speed Vs. A steering angle sensor 12 detects a steering angle θ of the own vehicle SV. The steering angle sensor 12 outputs a signal which represents the detected steering angle θ[deg]. A yaw rate sensor 13 detects a yaw rate Yr of the own vehicle SV. The yaw rate sensor 13 outputs a signal which represents the detected yaw rate Yr.

It should be noted that the steering angle θ and the yaw rate Yr are zero, respectively when the own vehicle SV moves straight. The steering angle θ and the yaw rate Yr take positive values, respectively when the own vehicle SV turns left. On the other hand, the steering angle θ and the yaw rate Yr take negative values, respectively when the own vehicle SV turns right.

Hereinafter; information on moving states of the own vehicle SV output from the sensors 11 to 13 will be also referred to as "moving state information". It should be noted that the own vehicle SV may include sensors which acquire other moving state information such as an acceleration value of the own vehicle SV.

Surrounding sensors 14 acquire information on standing objects in a surrounding area around the own vehicle SV. The surrounding area around the own vehicle SV at least includes a forward area ahead of the own vehicle SV. In this embodiment, the surrounding area includes a forward area ahead of the own vehicle SV, a right side area at the right side of the own vehicle SV, and a left side area at the left side of the own vehicle SV. The standing objects include, for example, (i) moving objects such as four-wheel vehicles, two-wheel vehicles, and pedestrians and (ii) non-moving objects such as electric poles, trees, and guard rails, Hereinafter, the standing object will be simply referred to as "object". The surrounding sensors 14 are configured to calculate and output information on the objects. Hereinafter, the information on the objects will be referred to as "object information".

Figure 2:
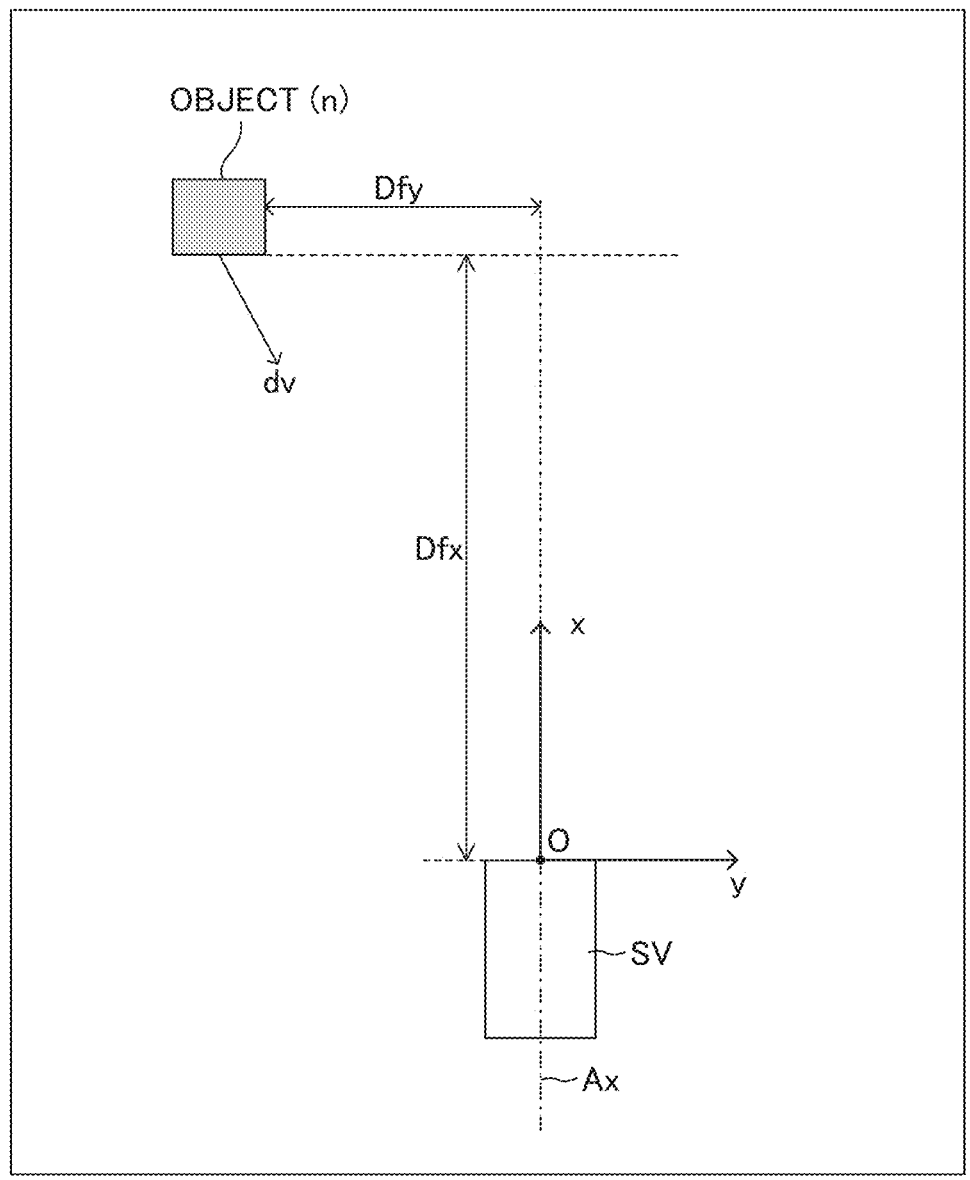
FIG. 2 is a view which describes object information acquired by surrounding sensors.

As shown in FIG. 2, the surrounding sensors 14 acquire the object information by using a two dimension coordinate system. The two dimension coordinate system is defined by an x-axis and a y-axis. An origin of the x-axis and the y-axis is a center position O of a front portion of the own vehicle SV. The center position is a center in a vehicle width direction of the own vehicle SV. The x-axis extends in a longitudinal direction of the own vehicle SV through the center position O of the own vehicle SV. The x-axis is a coordinate axis which has positive values corresponding to positions forward from the own vehicle SV. The x-axis corresponds to a longitudinal direction line Ax which extends in the longitudinal direction of the own vehicle SV. The y-axis extends perpendicular to the x-axis. The y-axis is a coordinate axis which has positive values corresponding to positions right from the own vehicle SV.

The object information on the object (n) includes a longitudinal distance $Dfx(n)$ of the object (n), a lateral position $Dfy(n)$ of the object (n), a moving direction vector dv of the object (n), a relative speed $Vfx(n)$, and a type of the object (n).

The longitudinal distance $Dfx(n)$ is a distance in an x-axis direction between the object (n) and the origin O. The longitudinal distance $Dfx(n)$ can take positive and negative values. The lateral distance $Dfy(n)$ is a distance in a y-axis direction between the object (n) and the origin O. The lateral distance $Dfy(n)$ can take positive and negative values. The relative speed $Vfx(n)$ is a moving speed of the object (n) with respect to the own vehicle SV in the x-axis direction. In other words, the relative speed $Vfx(n)$ is a difference between a moving speed Vn of the object (n) in the x-axis direction and the moving speed Vs of the own vehicle SV in the x-axis direction ($Vfx(n)=Vn-Vs$).

The moving direction vector $dv(n)$ is a directional vector which represents a moving direction of the object (n) with respect to the x-axis (i.e., the longitudinal direction line Ax of the own vehicle SV). The type of the object (n) corresponds to information on which the object is, the moving object or the non-moving object. In this embodiment, when the object is the moving-object, the type of the object (n) includes information on which the object (n) is, the four-wheel vehicle, the two-wheel vehicle, or the pedestrian.

Again, referring to FIG. 1, the surrounding sensors 14 include at least one radar sensor 15, at least one camera sensor 16, and an object detecting ECU 17.

The radar sensor 15 includes a radar wave transmitting/receiving section and an information processing section. The radar wave transmitting/receiving section transmits electromagnetic waves such as radio waves of a millimeter wave band (hereinafter, the radio waves of the millimeter wave band will be referred to as "millimeter waves"), In addition, the radar wave transmitting/receiving section receives the millimeter waves which are reflected by the objects in a transmitting area. That is, the radar wave transmitting/receiving section receives reflected waves. The information processing section detects the object (n), based on reflected wave information. The reflected wave information includes (i) a phase difference between the transmitted millimeter wave and the received reflected wave, (ii) an attenuated level of the reflected wave, and (iii) time taken to receive the reflected wave from transmitting the millimeter wave. In addition, the information processing section acquires or calculates the object information on the objects (n), based on the reflected wave information.

The camera sensor 16 includes a camera and an image processing section. The camera outputs image data to the image processing section with a predetermined frame rate. The image processing section detects the objects (n) and acquires or calculates the object information on the detected objects (n), based on the image data. It should be noted that the image processing section recognizes or determines the types of the detected objects (n). The image processing section has stored patten data of the objects such as the four-wheel vehicles, the two-wheel vehicles, and the pedestrians in a memory (for example, the ROM). The image processing section recognizes which each object (n) is, the four-wheel vehicle, the two-wheel vehicle, or the pedestrian by pattern-matching with the image data.

The image processing section may be configured to detect lane markings, based on the image data. The lane markings define traffic lanes. The lane markings include (i) lane markings which define a traffic lane in which the own vehicle SV is moving and (ii) lane markings which define an oncoming lane. Further, the image processing section may be configured to acquire or calculate information on the lane markings such as positions of the lane markings and lane widths of the traffic lanes as lane information on the two dimension coordinate system.

The object detecting ECU 17 determines conclusive object information by synthesizing the object information acquired by the radar sensor 15 and the object information acquired by the camera sensor 16. The object detecting ECU 17 outputs the object information and the lane information to the ECU 10 as vehicle surrounding information.

The engine ECU 20 is electrically connected to engine actuators 21. The engine actuators 21 include a throttle valve actuator which changes an opening degree of a throttle valve of a spark-ignition gasoline injection type of an internal combustion engine 22. The engine ECU 20 can change torque which the internal combustion engine 22 generates by driving the engine actuators 21. The torque generated by the internal combustion engine 22 is transmitted to driven-wheels (not shown) of the own vehicle SV via a transmission (not shown). Thus, the engine ECU 20 can control driving force and change an accelerated state of the own vehicle SV or an acceleration of the own vehicle SV by controlling the engine actuators 21.

When the own vehicle SV is a hybrid vehicle, the engine ECU 20 can control the driving force generated by one or both of the internal combustion engine and at least one electric motor as vehicle driving sources. When the own vehicle SV is an electric vehicle, the engine ECU 20 can control the driving force generated by at least one electric motor as the vehicle driving source.

The brake ECU 30 is electrically connected to brake actuators 31. The brake actuators 31 include hydraulic circuits. The hydraulic circuits include a master cylinder, flow passages through which braking liquid flows, valves, at least one pump, and at least one motor which drives the at least one pump. The brake ECU 30 adjusts hydraulic pressure applied to wheel cylinders incorporated in brake mechanisms 32 by controlling the brake actuators 31. The hydraulic pressure causes the wheel cylinders to generate friction braking force applied to wheels of the own vehicle SV. Thus, the brake ECU 30 can control the braking force and change the accelerated state of the own vehicle SV or deceleration or negative acceleration of the own vehicle SV by controlling the brake actuators 31.

The meter ECU 40 is electrically connected to a display 41, a speaker 42, and a turn signal switch 43. The display 41 is a multi-information display provided in front of a driver's seat. The display 41 may be a head-up display. It should be noted that hereinafter the display 41 and the speaker 42 will be also collectively referred to as "informing apparatus".

The meter ECU 40 controls the informing apparatus in response to a command from the ECU 10. In particular, the meter ECU 40 displays an alert mark (for example, warning lamp) on the display 41. In addition, the meter ECU 40 outputs an alert sound for alerting a driver of the own vehicle SV from the speaker 42.

Further, the meter ECU 40 blinks left and right turn signal lamps (not shown) in response to a signal from the turn signal switch 43. The meter ECU 40 sends an activated state of the left or right turn signal lamps to the ECU 10.

The navigation ECU 50 is electrically connected to a GPS receiver 51, a map storing section 52, and a touch panel 53. The GPS receiver 51 receives GPS signals used to detect a longitude and a latitude of a place where the own vehicle SV is located. The map storing section 52 stores map information. The map information includes road information. The road information includes information on positions of traffic lanes, the number of the traffic lanes, lengths of the traffic lanes in a width direction of the road (i.e., widths of the traffic lanes), and types of the traffic lanes (for example, a right-turn-only lane or a left-turn-only lane). The navigation ECU 50 performs various calculation processing, based on (i) the longitude and the latitude of the place where the own vehicle SV is located and (ii) the map information and displays a position of the own vehicle SV on a map on the touch panel 53.

<Processes on Two Dimension Coordinate System>

The ECU 10 executes processes on the two dimension coordinate system as described below to execute an alert control described later.

Figure 3:
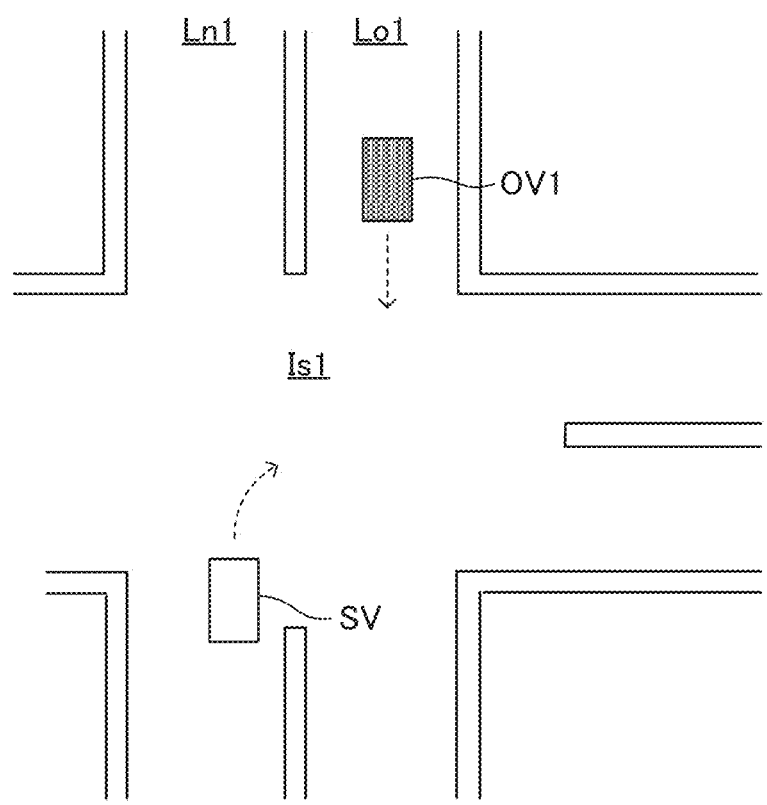
FIG. 3 is a view which shows an example of a situation that own vehicle turns right at a traffic intersection.

In an example shown in FIG. 3, the own vehicle SV moves in a first traffic lane Ln1. The own vehicle SV is going to turn right at a traffic intersection Is1. Further, a first other vehicle OV1 moves in a first oncoming lane Lo1. The first oncoming lane Lo1 is an oncoming lane for the first moving lane Ln1.

Figure 4:
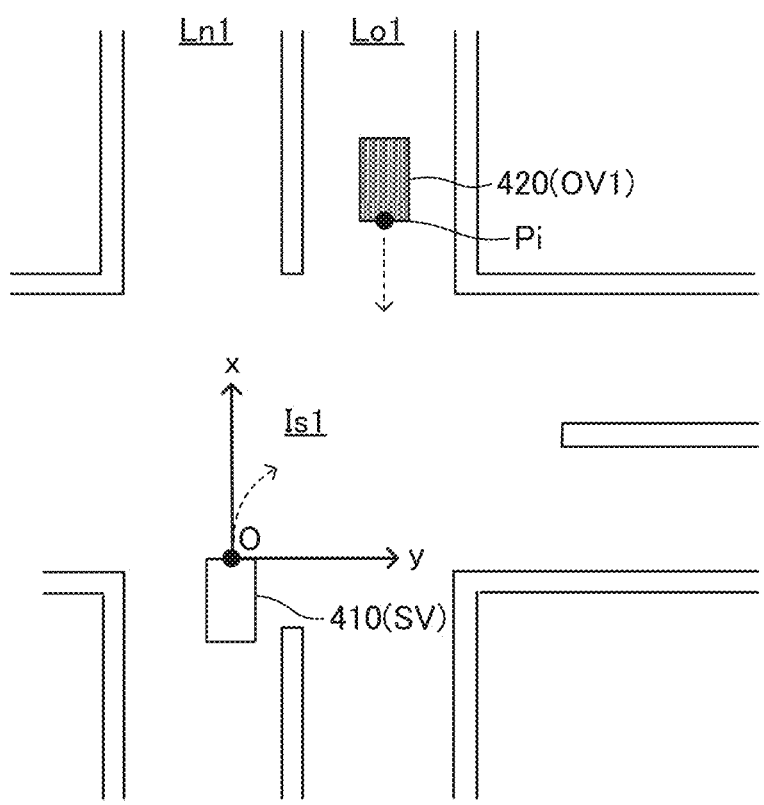
FIG. 4 is a view which describes processes on a two dimension coordinate system.

In this example, the ECU 10 draws the own vehicle SV and the first other vehicle OV1 in a simplified manner on the two dimension coordinate system. In particular, as shown in FIG. 4, the ECU 10 draws a first rectangle 410 on the two dimension coordinate system. The first rectangle 410 represents a body of the own vehicle SV. The ROM 102 has stored information on a size of the body of the own vehicle SV. The ECU 10 sets a size of the first rectangle 410, based on this stored information on the size of the body of the own vehicle SV. In addition, the ECU 10 draws a second rectangle 420 on the two dimension coordinate system. The second rectangle 420 represents a body of the first other vehicle OV1. A size of the second rectangle 420 may be set, based on a size of a body of a general vehicle.

Hereinafter, an x-y-coordinate of a center position of the second rectangle 420 on the two dimension coordinate system will be referred to as "center position Pi". The center position Pi corresponds to a center position of a front portion of the first other vehicle OV1. The center position of the front portion of the first other vehicle OV1 is a center in a width direction of the first other vehicle OV1. Further, the center position Pi will be also simply referred to as "position Pi".

<Summary of Alert Control>

The ECU 10 determines whether there are oncoming vehicles having a probability of colliding with the own vehicle SV, based on a method described below when the own vehicle SV turns right at the traffic intersection. When the ECU 10 determines whether there is at least one oncoming vehicle having the probability of colliding with the own vehicle SV, the ECU 10 executes the alert control.

In particular, the ECU 10 determines whether the own vehicle SV is going to turn right, based on the activated situation of the right turn signal lamp and/or the moving state information such as the steering angle θ or the yaw rate Yr. In this embodiment, when the right turn signal lamp is turned on, the ECU 10 determines that the own vehicle SV is going to turn right and executes processes described below.

It should be noted that when the right turn signal lamp is turned on, and the yaw rate Yr is smaller than a predetermined right turn start threshold (a negative value) Yrth, the ECU 10 may determine that the own vehicle SV is going to turn right.

The ECU 10 recognizes the objects in the surrounding area around the own vehicle SV, based on the object information. Then, the ECU 10 selects or picks up, from the recognized objects, the other vehicles which is in the surrounding area around the own vehicle SV and moves toward the own vehicle SV. Hereinafter, the other vehicles selected this way will be referred to as "approaching vehicles".

When the ECU 10 selects at least one approaching vehicle, the ECU 10 determines whether the approaching vehicle is an oncoming vehicle having the probability of colliding with the own vehicle SV by using information on the two dimension coordinate system as described later. In this description, the oncoming vehicle is a vehicle which moves, crossing a moving path of the turning own vehicle SV. Hereinafter, a process of determining whether the approaching vehicle is the oncoming vehicle having the probability of colliding with the own vehicle SV will be referred to as "oncoming vehicle determination process".

When the ECU 10 determines that the approaching vehicle is the oncoming vehicle, the ECU 10 executes the alert control. The alert control is a control of alerting the driver of the own vehicle SV about the oncoming vehicle. In particular, the ECU 10 sends an alert command signal to the meter ECU 40. When the meter ECU 40 receives the alert command signal from the ECU 10, the meter ECU 40 controls the informing apparatus, depending on the alert command signal. In particular, the meter ECU 40 displays an alert mark on the display 41 and outputs an alert sound from the speaker 42.

<Oncoming Vehicle Determination Process>

Figure 5:
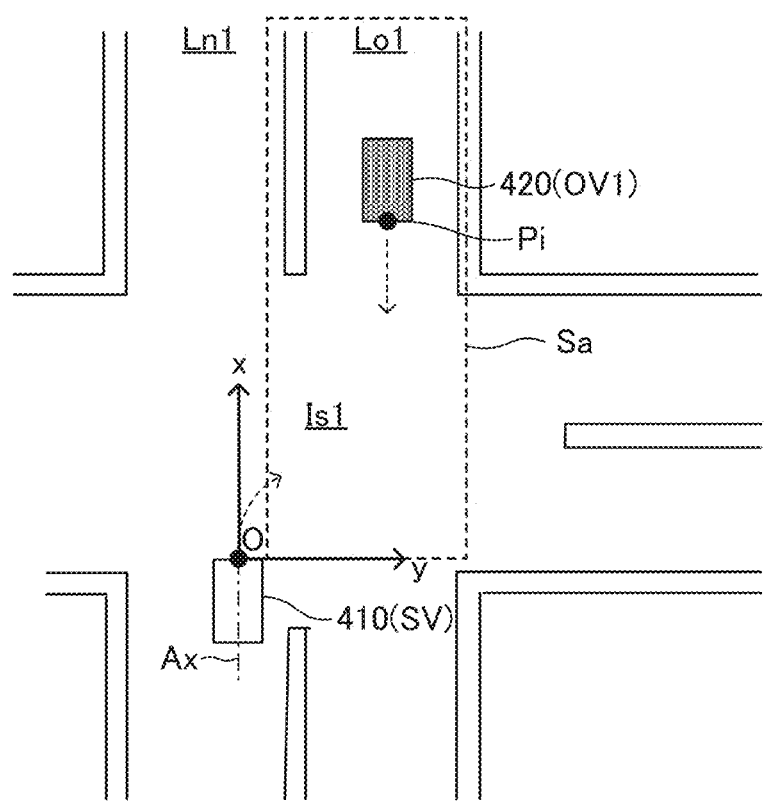
FIG. 5 is a view which describes an oncoming vehicle determination process of determining whether an approaching vehicle is an oncoming vehicle.

Next, the oncoming vehicle determination process will be described. FIG. 5 shows the same situation as the situation shown in FIG. 4. The first other vehicle OV1 is in the surrounding area around the own vehicle SV and moves toward the own vehicle SV. Thus, the ECU 10 selects the first other vehicle OV1 as the approaching vehicle.

In general, the oncoming vehicle having the probability of colliding with the own vehicle SV turning right at the traffic intersection Is1 is ahead of the own vehicle SV and at a turning direction side of the own vehicle SV, i.e., at the right side of the own vehicle SV. Accordingly, the ECU 10 sets a determination area Sa on the two dimension coordinate system. The determination area Sa is an area which the ECU 10 uses to determine whether the approaching vehicle is the oncoming vehicle.

Figure 6:
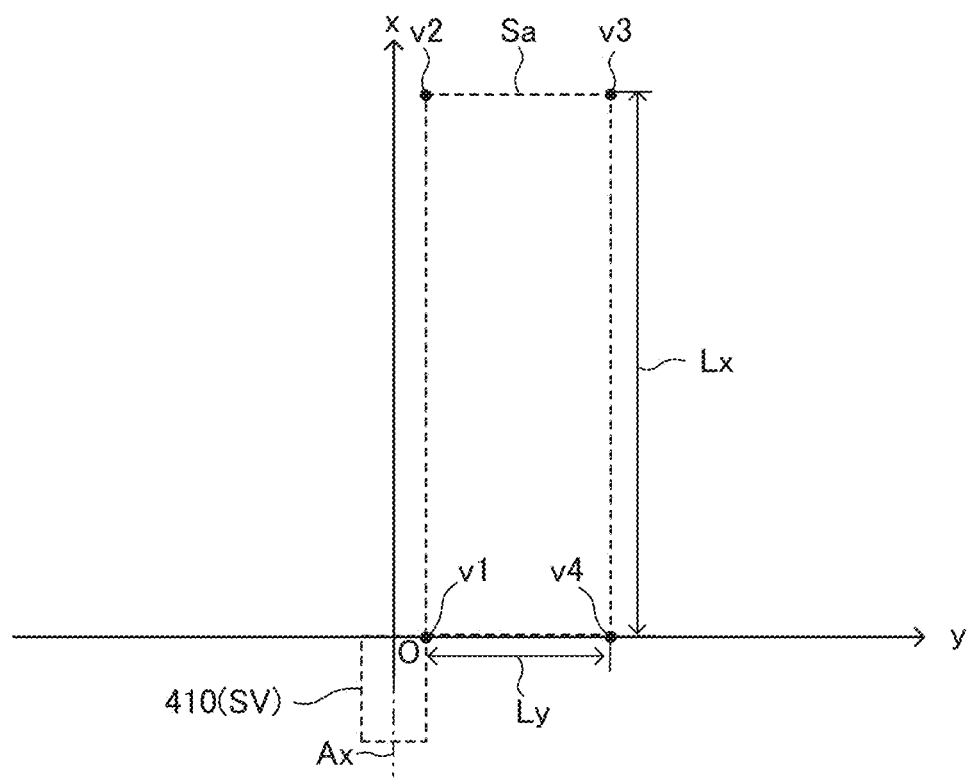
FIG. 6 is a view which shows a determination area used in the oncoming vehicle determination process.

As shown in FIG. 6, the determination area Sa is an area which is positioned at the turning direction side or the right side of the longitudinal direction line Ax of the own vehicle SV, i.e., at the turning direction side or the right side of the x-axis and extends forward from the own vehicle SV.

The determination area Sa is a rectangular area which is defined by four vertexes v1 to v4. Long sides of the determination area Sa are parallel to the x-axis. Short sides of the determination area Sa are parallel to the y-axis.

The vertex v1 corresponds to a right corner of the front portion of the own vehicle SV. A value of an x-coordinate of the vertex v1 is the smallest one of the values of the x-coordinates of the four vertexes v1 to v4. In this example, the value of the x-coordinate of the vertex v1 is zero. A value of a y-coordinate of the vertex v1 is the smallest one of the values of the y-coordinates of the four vertexes v1 to v4.

The value of the x-coordinate of the vertex v2 is the greatest one of the values of the x-coordinates of the four vertexes v1 to v4. The value of the y-coordinate of the vertex v2 is equal to the value of the y-coordinate of the vertex v1.

The value of the x-coordinate of the vertex v3 is equal to the value of the x-coordinate of the vertex v2. The value of the y-coordinate of the vertex v3 is the greatest one of the values of the y-coordinates of the four vertexes v1 to v4.

The value of the x-coordinate of the vertex v4 is equal to the value of the x-coordinate of the vertex v1. Thus, the value of the x-coordinate of the vertex v4 is zero. The value of the y-coordinate of the vertex v4 is equal to the value of the y-coordinate of the vertex v3.

When the approaching vehicle is in the determination area Sa set as described above, the approaching vehicle probably is the oncoming vehicle, i.e., a vehicle having the probability of colliding with the own vehicle SV.

Accordingly, the ECU 10 determines whether the position Pi of the approaching vehicle or the first other vehicle OV1 is in the determination area Sa. When the position Pi of the approaching vehicle is in the determination area Sa, the ECU 10 determines that the approaching vehicle is the oncoming vehicle.

Figure 7:
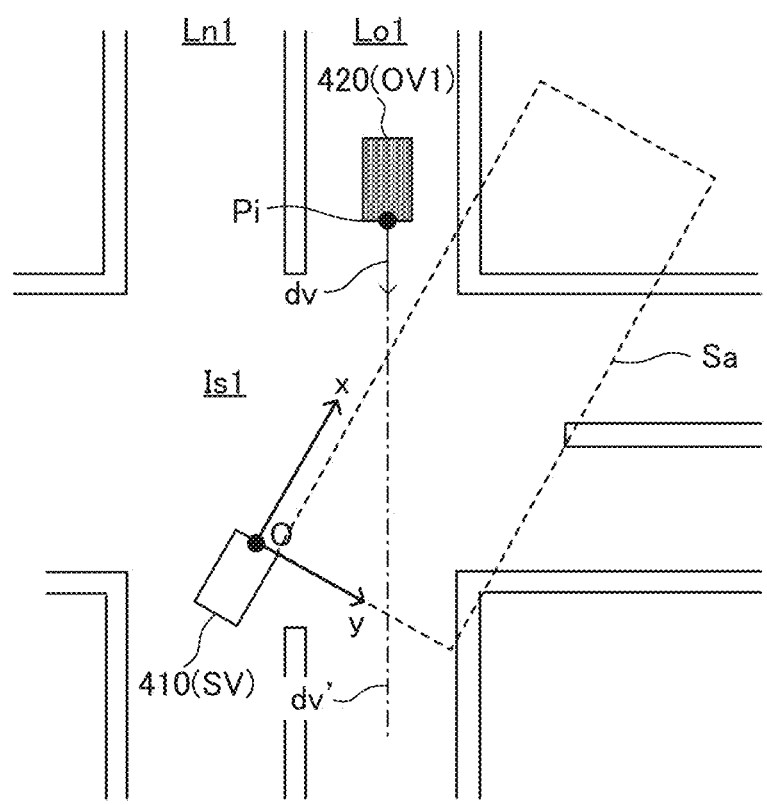
FIG. 7 is a view which describes the oncoming vehicle determination process.

On the other hand, as shown in FIG. 7, after the own vehicle SV starts turning right, the position Pi of the approaching vehicle or the first other vehicle OV1 moving in the first oncoming lane Lo1 is not in the determination area Sa. In this situation, the approaching vehicle should be determined as the oncoming vehicle.

Accordingly, the ECU 10 determines whether the approaching vehicle is the oncoming vehicle, using additional conditions. In particular, as shown in FIG. 7, the ECU 10 draws an extension line dv' on the two dimension coordinate system. The extension line dv' is a line acquired by extending a moving direction vector dv of the approaching vehicle. The extension line dv' corresponds to a predicted route which is predicted for the first other vehicle OV1 to pass. When the extension line dv' crosses the determination area Sa, the approaching vehicle has the possibility of colliding with the own vehicle SV. Thus, the ECU 10 determines whether the extension line dv' of the moving direction vector dv of the approaching vehicle crosses the determination area Sa. When the extension line dv' crosses the determination area Sa, the ECU 10 determines that the approaching vehicle is the oncoming vehicle.

As described above, when any one of a condition A1 and a condition A2 described below is satisfied, the ECU 10 determines that the approaching vehicle is the oncoming vehicle.

Condition A1: The position Pi of the approaching vehicle is in the determination area Sa.

Condition A2: The extension line dv' of the moving direction vector dv of the approaching vehicle crosses the determination area Sa.

In this regard, the traffic intersection may have a complicated configuration. A traffic intersection Is2 shown in FIG. 8 has three roads RD1, RD2, and RD3 which cross not perpendicular to each other. At this traffic intersection Is2, the own vehicle SV is going to turn right from the road RD1 to the road RD2 as shown by an arrow ar1. The first other vehicle OV1 moving on the road RD3 approaches the own vehicle SV. However, this first other vehicle OV1 may not collide with the own vehicle SV. However, the ECU 10 selects the first other vehicle OV1 as the approaching vehicle and determines that the first other vehicle OV1 satisfies the condition A1. Thus, the ECU 10 determines that the approaching vehicle is the oncoming vehicle and executes the alert control. Thereby, even when the first other vehicle OV1 may not collide with the own vehicle SV, the alert control is executed. Thus, the driver of the own vehicle SV may feel bothersome.

For solving this problem, the inventors of this application have considered configurations of various traffic intersections and found solutions below. In particular, the ECU 10 changes a position and a size of the determination area Sa, based on a moving direction angle θs of the approaching vehicle. Thereby, the ECU 10 can reduce a possibility of determining the approaching vehicle having the low probability of colliding with the own vehicle SV as the oncoming vehicle.

First, the moving direction angle θs of the approaching vehicle will be described. The moving direction angle θs is an angle defined by the longitudinal direction line Ax of the own vehicle SV, i.e., the x-axis and the moving direction vector dv of the approaching vehicle.

Figure 9:
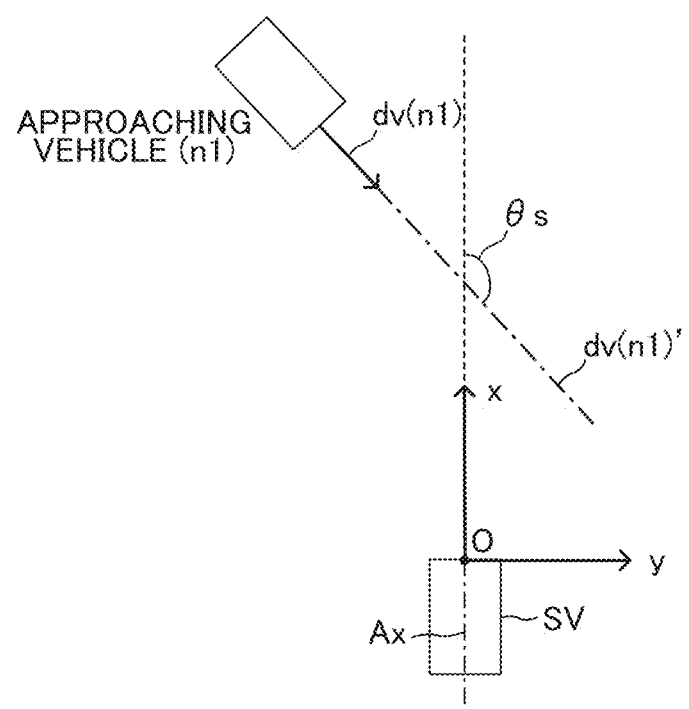
FIG. 9 is a view which describes a moving direction angle θs.

In an example shown in FIG. 9, the approaching vehicle (n1) is at the left side of the x-axis. In other words, the approaching vehicle (n1) is at the opposite side to the turning direction side. Hereinafter, this situation shown in FIG. 9 will be referred to as "first situation". In the first situation, the ECU 10 draws the extension line dv(n1)' of the moving direction vector dv(n1) of the approaching vehicle (n1) on the two dimension coordinate system. The moving direction angle θs is an angle defined by the x-axis and the extension line dv(n1)'. In the first situation, the ECU 10 calculates, as the moving direction angle θs, an angle clockwise from the x-axis to the extension line dv(n1)' with the x-axis being zero degrees. In this example, the calculated angle clockwise from the x-axis takes a positive value. Thus, in the first situation, a range of the moving direction angle θs is from 0 degrees to 180 degrees.

Figure 10:
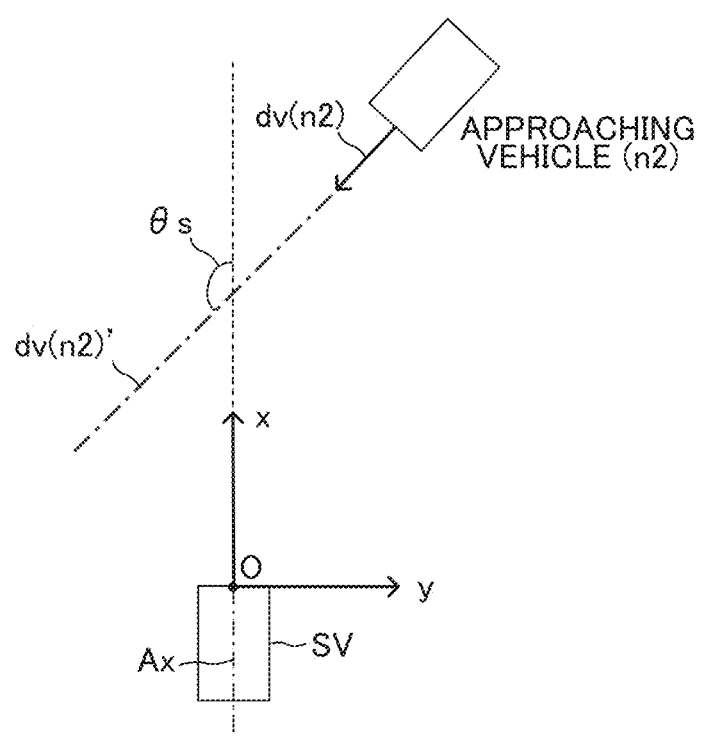
FIG. 10 is a view which describes the moving direction angle θs.

In an example shown in FIG. 10, the approaching vehicle (n2) is at the right side of the x-axis. In other words, the approaching vehicle (n2) is at the turning direction side. Hereinafter, this situation will be referred to as "second situation". In the second situation, similar to the example shown in FIG. 9, the ECU 10 draws the extension line dv(n2)' of the moving direction vector dv(n2) of the approaching vehicle (n2) on the two dimension coordinate system. In this example, the moving direction angle θs is defined by the x-axis and the extension line dv(n2)'. In the second situation, the ECU 10 calculates, as the moving direction angle θs, an angle counterclockwise from the x-axis to the extension line dv(n2)' with the x-axis being zero degrees. In this example, the calculated angle counterclockwise from the x-axis takes a negative value. Thus, in the second situation, a range of the moving direction angle θs is from 0 degrees to −180 degrees.

The inventors of this application have had knowledge below on a relationship between the moving direction angle θs and the determination area Sa.

Figure 11:
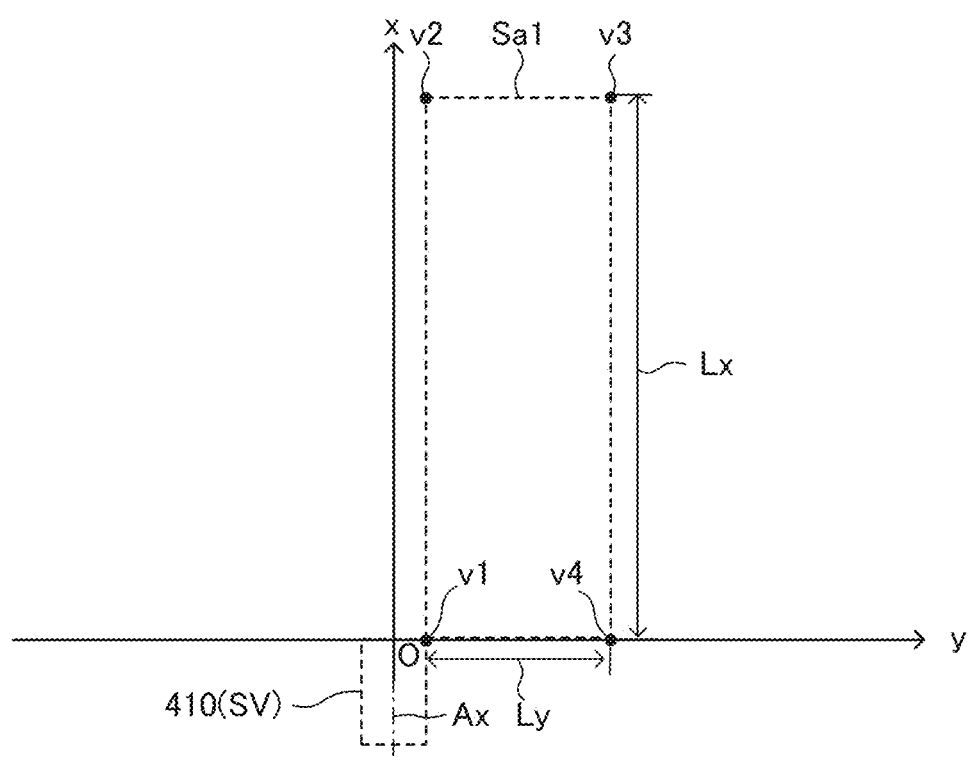
FIG. 11 is a view which shows a first area used to determine whether the approaching vehicle is the oncoming vehicle.

When an angle condition that the moving direction angle θs is within a predetermined angle range, becomes satisfied, whether the approaching vehicle is the oncoming vehicle or not, can be accurately determined by using a first area Sa1 shown in FIG. 11 as the determination area Sa.

When the angle condition is not satisfied, a possibility of determining the approaching vehicle having the low probability of colliding with the own vehicle SV as the oncoming vehicle, can be reduced.

In particular, the angle condition includes a condition B1 and a condition B2 below. The angle condition becomes satisfied when any one of the conditions B1 and B2 becomes satisfied.

Figure 13:
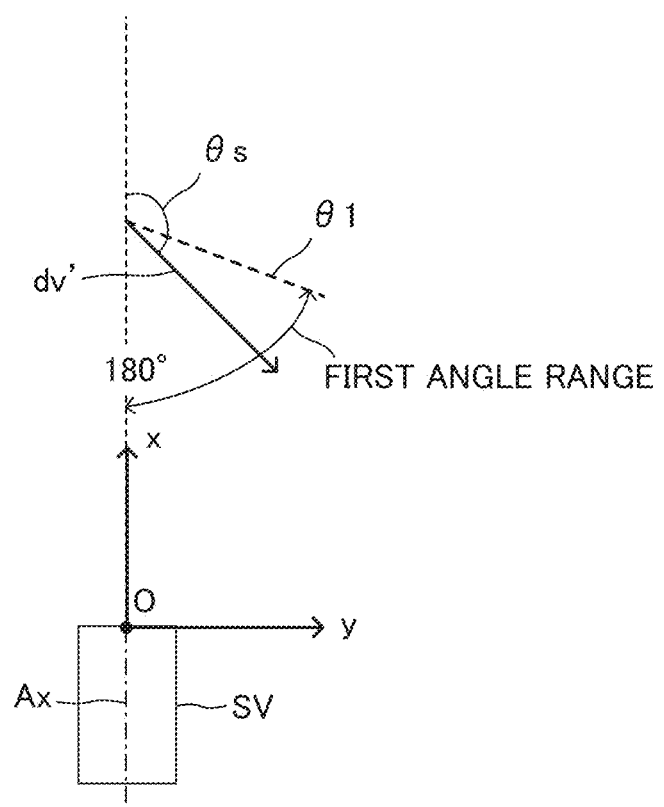
FIG. 13 is a view which describes an angle condition relating to the moving direction angle θs.

Condition B1: In the first situation, the moving direction angle θs is within a first angle range. As shown in FIG. 13, the first angle range is a range equal to or greater than a first angle θ1 and equal to or smaller than 180 degrees. The first angle θ1 is set to an angle greater than 90 degrees and smaller than 180 degrees. According to one or more embodiments, the first angle θ1 is set to an angle greater than 110 degrees and smaller than 180 degrees.

Figure 14:
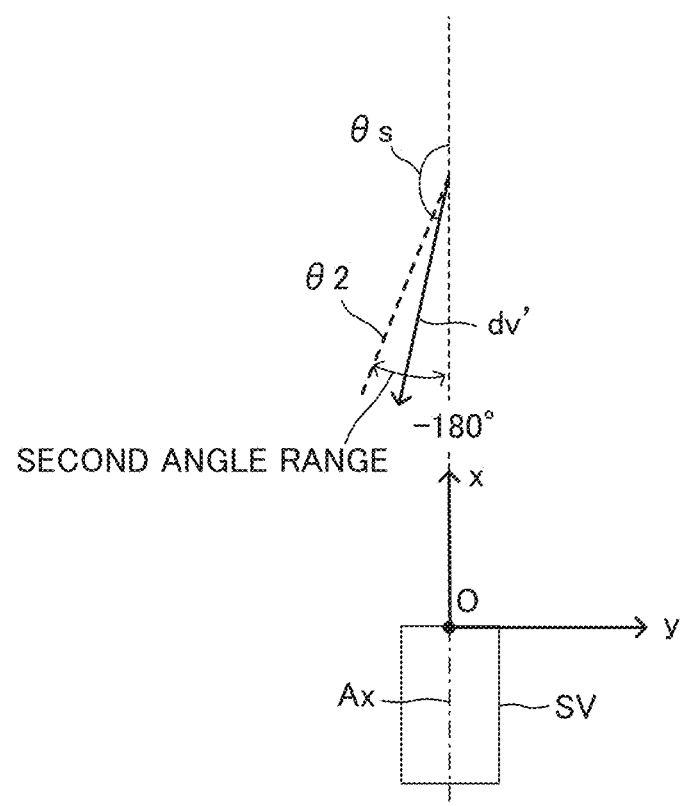
FIG. 14 is a view which describes the angle condition relating to the moving direction angle θs.

Condition B2: In the second situation, the moving direction angle θs is within a second angle range. As shown in FIG. 14, the second angle range is a range equal to or smaller than a second angle θ2 and equal to or greater than −180 degrees. The second angle θ2 is set to an angle smaller than −90 degrees and greater than −180 degrees. According to one or more embodiments, the second angle θ2 is set to an angle smaller than −135 degrees and greater than −180 degrees.

The first area Sa1 shown in FIG. 11 is the same as the determination area Sa shown in FIG. 6. As described above, the vertex v1 corresponds to the right corner portion of the front portion of the own vehicle SV. Thus, the first area Sa1 is at the turning direction side or the right side of the longitudinal direction line Ax of the own vehicle SV or the x-axis and extends forward from the own vehicle SV.

A length Lx in the x-axis direction of the first area Sa1 or the longitudinal direction of the own vehicle SV is longer than a length Ly in the y-axis of the first area Sa1 or a left-right direction of the own vehicle SV. In this example, the length Lx is set to a relatively long length so as to include the oncoming vehicle in the first area Sa1. The length Ly is set to a length equal to or longer than the lane width of the oncoming lane.

Figure 12:
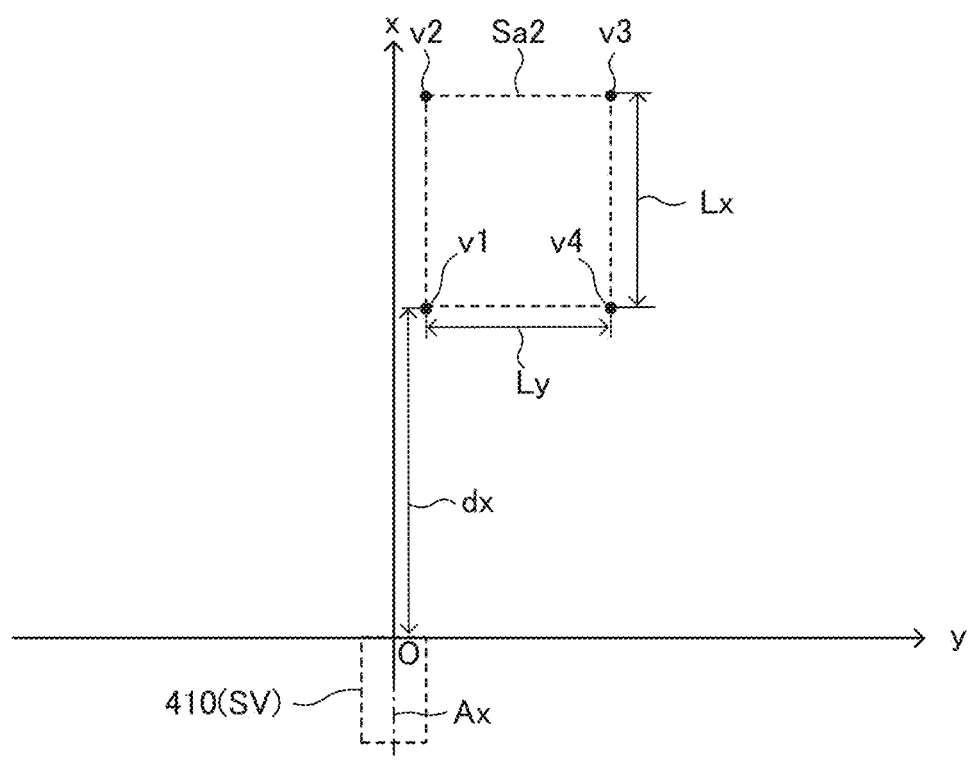
FIG. 12 is a view which shows a second area used to determine whether the approaching vehicle is the oncoming vehicle.

The second area Sa2 shown in FIG. 12 is at the turning direction side or the right side of the longitudinal direction line Ax of the own vehicle SV or the x-axis and away forward from the own vehicle SV by a predetermined distance dx.

In particular, the value of the x-coordinate of the vertex v1 of the second area Sa2 is greater than the value of the x-coordinate of the vertex v1 of the first area Sa1. Further, the value of the y-coordinate of the vertex v1 of the second area Sa2 is equal to the value of the x-coordinate of the vertex v1 of the first area Sa1. Furthermore, the value of the x-coordinate of the vertex v4 of the second area Sa2 is equal to the value of the x-coordinate of the vertex v1 of the second area Sa2. Furthermore, the value of the y-coordinate of the vertex v4 of the second area Sa2 is equal to the value of the y-coordinate of the vertex v4 of the first area Sa1. Furthermore, the value of the x-coordinate and the value of the y-coordinate of the vertex v2 of the second area Sa2 are equal to the value of the x-coordinate and the value of the y-coordinate of the vertex v2 of the first area Sa1, respectively. Furthermore, the value of the x-coordinate and the value of the y-coordinate of the vertex v3 of the second area Sa2 are equal to the value of the x-coordinate and the value of the y-coordinate of the vertex v3 of the first area Sa1, respectively.

Thus, the length Lx of the second area Sa2 is shorter than the length Lx of the first area Sa1. The length Ly of the second area Sa2 is equal to the length Ly of the first area Sa1.

Figure 15:
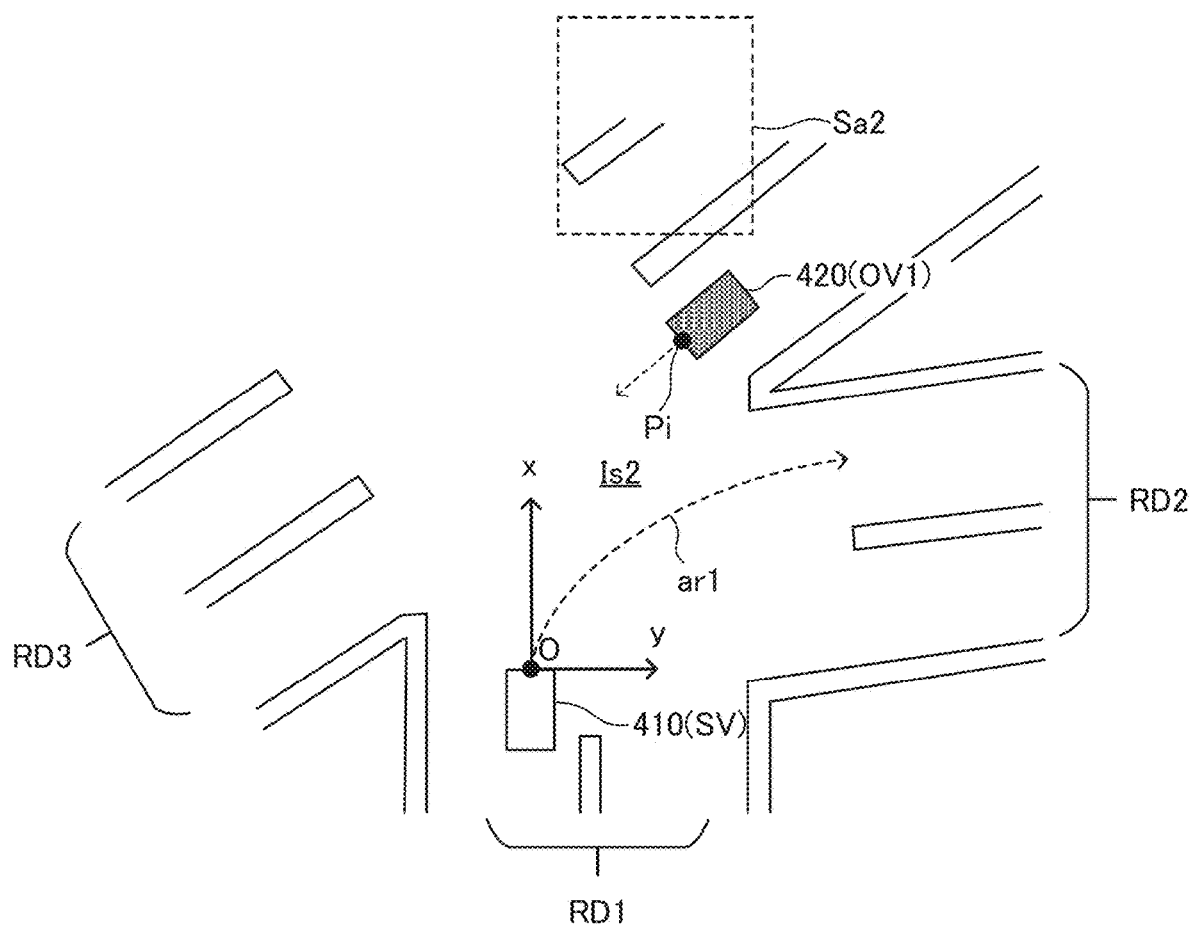
FIG. 15 is a view which describes a result acquired by executing the oncoming vehicle determination process, using the second area in a situation shown in FIG. 8.

With this configuration, effects below can be provided. FIG. 15 shows the same situation as the situation shown in FIG. 8. The approaching vehicle (i.e., the first other vehicle OV1) is at the right side of the x-axis. Thus, the situation shown in FIG. 15 corresponds to the second situation. The moving direction angle θs of the approaching vehicle (i.e., the first other vehicle OV1) is not within the second angle range. Thus, the ECU 10 determines whether the approaching vehicle is the oncoming vehicle, using the second area Sa2 as the determination area Sa. In this situation, neither the condition A1 nor the condition A2 is satisfied. Thus, the ECU 10 determines that the approaching vehicle is not the oncoming vehicle. Thus, the ECU 10 does not execute the alert control. Thereby, the alert control is not executed when there is no possibility that the approaching vehicle collides with the own vehicle SV. Thus, the driver does not feel bothersome.

It should be noted that in this example, there is an expression 1 below between the first angle θ1 and the second angle θ2.

$$|\theta 1| < |\theta 2| \tag{1}$$

In other words, the first angle range is greater than the second angle range. This is derived from facts below. In many cases, after the own vehicle SV starts turning right at the traffic intersection, the oncoming vehicle is at the left side of the x-axis, i.e., at the opposite side to the turning direction side (for example, see FIG. 7). In this case, when a right turning degree of the own vehicle SV is small, the moving direction angle θs is relatively large. As the right turning degree of the own vehicle SV increases, the moving direction angle θs decreases. Thus, in the first situation, the moving direction angle θs of the oncoming vehicle having the probability of colliding with the own vehicle SV considerably changes, depending on the right turning degree of the own vehicle SV. Accordingly, the first angle range is set to a great range in order to accurately determine whether the approaching vehicle is the oncoming vehicle.

On the other hand, in the second situation, the moving direction angle θs of the oncoming vehicle having the probability of colliding with the own vehicle SV is small, and a range of the moving direction angle θs is small. Thus, if the second angle range is set similar to the first angle range, the alert control may be executed when the approaching vehicle may not collide with the own vehicle SV. Accordingly, the second angle range is set to a range smaller than the first angle range.

<Operations>

Hereinafter, the CPU 101 of the ECU 10 will be simply referred to as "CPU". The CPU of the ECU 10 determines whether the own vehicle SV is going to turn right as described above. After the CPU determines that the own vehicle SV is going to turn right, the CPU executes routines shown in FIG. 16 and FIG. 17 each time a predetermined time dT elapses.

It should be noted that the CPU acquires the moving state information from the various sensors 11 to 13 and acquires the vehicle surrounding information from the surrounding sensors 14. Then, the CPU stores the acquired moving state information and the acquired vehicle surrounding information in the RAM 103.

In addition, the CPU sets a value of a flag X1 described later to "0" in executing an initialization routine when an ignition switch not shown is turned from an OFF state to an ON state.

Figure 16:
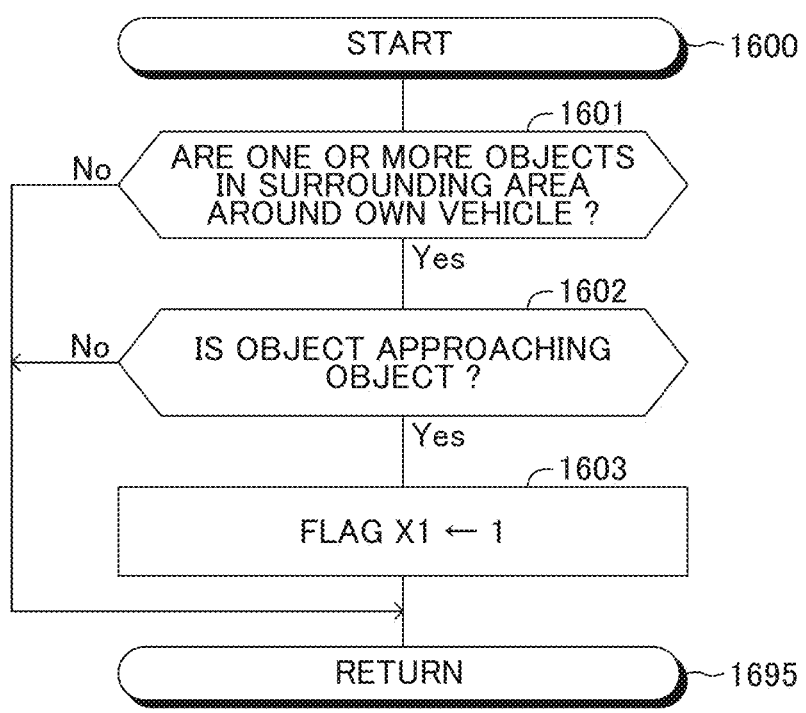
FIG. 16 is a view which shows a flowchart of a first routine executed by a CPU of an alert ECU.

At a predetermined timing, the CPU starts executing a process from a step 1600 of the routine shown in FIG. 16 and proceeds with the process to a step 1601 to determine whether one or more objects are in the surrounding area around the own vehicle SV, based on the object information. When no object is in the surrounding area around the own vehicle SV, the CPU determines "No" at the step 1601 and proceeds with the process directly to a step 1695 to terminate executing this routine once.

On the other hand, when one or more objects are in the surrounding area around the own vehicle SV, the CPU determines "Yes" at the step 1601 and proceeds with the process to a step 1602. At the step 1602, the CPU determines whether at least one of the objects recognized at the step 1601 is the approaching vehicle. As described above, the CPU selects, as the approaching vehicle from the recognized objects, each of the vehicles which is in the surrounding area around the own vehicle SV and moves toward the own vehicle SV. When the CPU selects at least one of the vehicles as the approaching vehicle, the CPU determines "Yes" at the step 1602 and proceeds with the process to a step 1603 to set the value of the flag X1 to "1". When the value of the flag X1 is "0", the flag X1 represents that there is no approaching vehicle. On the other hand, when the value of the flag X1 is "1" the flag X1 represents that there is at least one approaching vehicle. Then, the CPU proceeds with the process to the step 1695 to terminate executing this routine once.

It should be noted that when there is no approaching object, the CPU determines "No" at the step 1602 and proceeds with the process directly to the step 1695 to terminate executing this routine once.

Figure 17:
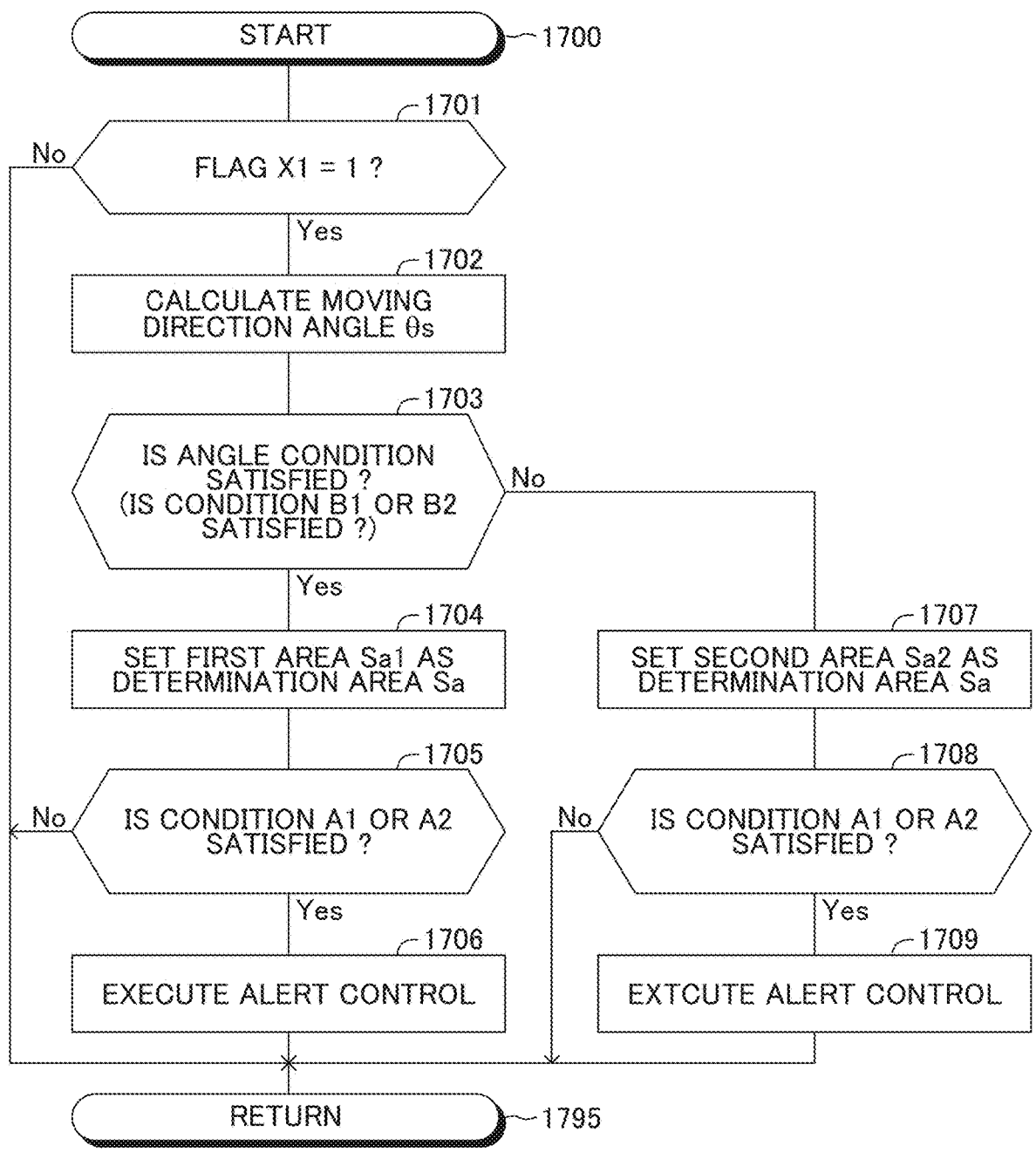
FIG. 17 is a view which shows a flowchart of a second routine executed by the CPU of the alert ECU.

Further, at a predetermined timing, the CPU starts executing the routine shown in FIG. 17. It should be noted that when the CPU determines that there are the approaching vehicles in executing the routine shown in FIG. 16, the CPU executes the routine shown in FIG. 17 for each approaching vehicle.

The CPU starts executing a process of the routine shown in FIG. 17 from a step 1700 and proceeds with the process to a step 1701 to determine whether the value of the flag X1 is "1". When the value of the flag X1 is not "1" the CPU determines "No" at the step 1701 and proceeds with the process directly to a step 1795 to terminate executing this routine once.

On the other hand, when there is at least one approaching vehicle, and the value of the flag is "1", the CPU determines "Yes" at the step 1701 and proceeds with the process to a step 1702 to calculate the moving direction angle θs of the approaching vehicle as described above. Then, the CPU proceeds with the process to a step 1703 to determine whether the angle condition described above is satisfied. In particular, the CPU determines whether any one of the conditions B1 and B2 is satisfied.

When the angle condition is satisfied, the CPU determines "Yes" at the step 1703 and proceeds with the process to a step 1704 to set the first area Sa1 shown in FIG. 11 as the determination area Sa on the two dimension coordinate system. Then, the CPU proceeds with the process to a step 1705 to determine whether any one of the conditions A1 and A2 described above is satisfied, using the first area Sa1. When any one of the conditions A1 and A2 is satisfied, the CPU determines that the approaching vehicle is the oncoming vehicle. In this case, the CPU determines "Yes" at the step 1705 and proceeds with the process to a step 1706 to execute the alert control. Then, the CPU proceeds with the process to the step 1795 to terminate executing this routine once. It should be noted that after the CPU terminates executing the alert control, the CPU resets the value of the flag X1 to "0".

On the other hand, when neither the condition A1 nor the condition A2 is satisfied, the CPU determines "No" at the step 1705 and proceeds with the process directly to the step 1795 to terminate executing this routine once.

When the angle condition is not satisfied at the step 1703, the CPU determines "No" at the step 1703 and proceeds with the process to a step 1707 to set the second area Sa2 shown in FIG. 12 as the determination area Sa on the two dimension coordinate system. Then, the CPU proceeds with the process to a step 1708 to determine whether any one of the conditions A1 and A2 is satisfied. When any one of the conditions A1 and A2 is satisfied, the CPU determines that the approaching vehicle is the oncoming vehicle. In this case, the CPU determines "Yes" at the step 1708 and proceeds with the process to a step 1709 to execute the alert control. Then, the CPU proceeds with the process to the step 1795 to terminate executing this routine once. It should be noted that when the CPU terminates executing the alert control, the CPU resets the flag X1 to "0".

On the other hand, when neither the condition A1 nor the condition A2 is satisfied, the CPU determines "No" at the step 1708 and proceeds with the process directly to the step 1795 to terminate executing this routine once.

The alert apparatus configured as described above uses the first area Sa1 as the determination area Sa when the angle condition is satisfied. The first area Sa1 is at the right side of the longitudinal direction line Ax of the own vehicle SV, i.e., at the right side of the x-axis and extends forward from the own vehicle SV. Thereby, the condition A1 or A2 is satisfied with regard to the oncoming vehicle having the probability of colliding with the own vehicle SV. Thus, the alert apparatus can execute the alert control in an appropriate situation.

Figure 8:
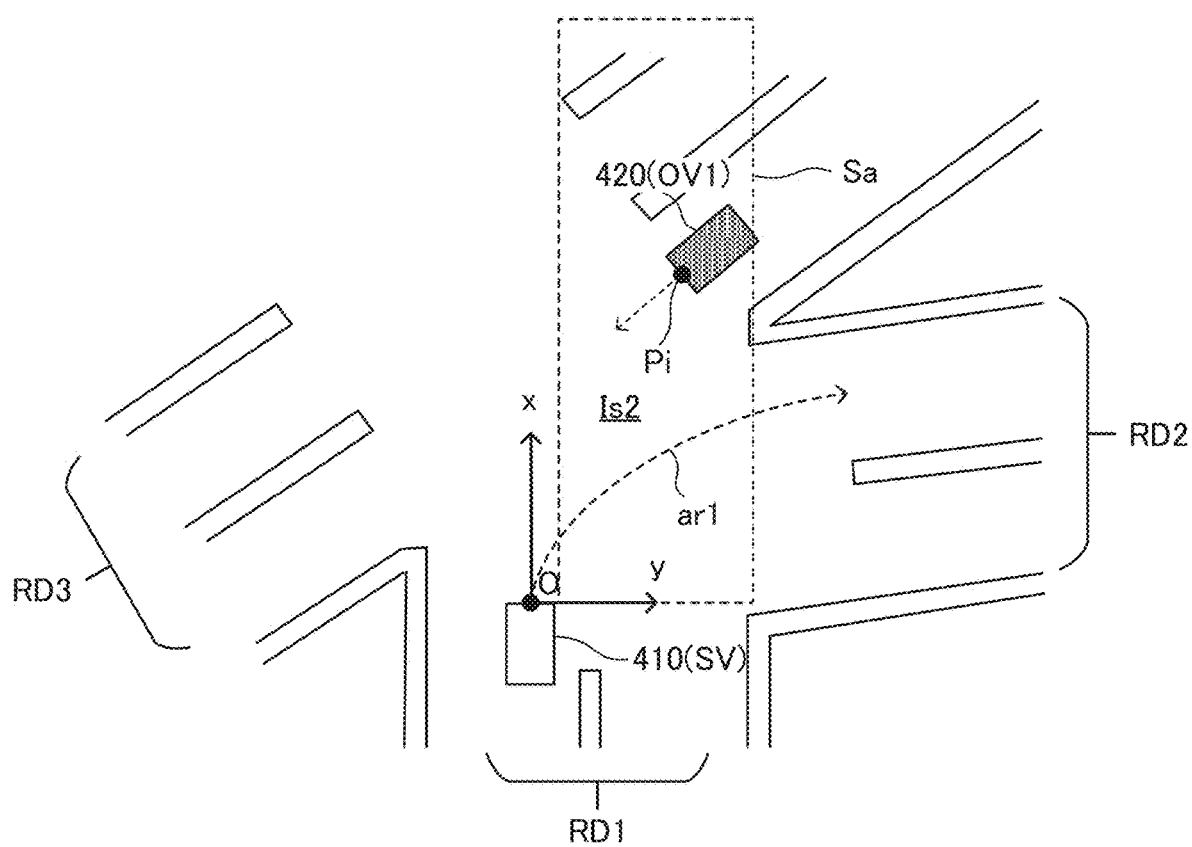
FIG. 8 is a view which describes a result acquired by executing the oncoming vehicle determination process at the complicated traffic intersection.

On the other hand, when the angle condition is not satisfied, the own vehicle SV may be turning at the complicated traffic intersection (see FIG. 8). Thus, the approaching vehicle has the low probability of colliding with the own vehicle SV. In this case, the alert apparatus uses the second area Sa2 as the determination area Sa. The second area Sa2 is set away forward from the own vehicle SV by the predetermine distance dx. Thus, the conditions A1 and A2 are unlikely to be satisfied. Thereby, the alert apparatus can reduce the possibility of determining the approaching vehicle having the low probability of colliding with the own vehicle SV as the oncoming vehicle. Thus, the alert apparatus can reduce a possibility of executing the alert control in unnecessary situation.

It should be noted that the invention is not limited to the aforementioned embodiments, and various modifications can be employed within the scope of the invention.

Modified Example 1

Figure 18:
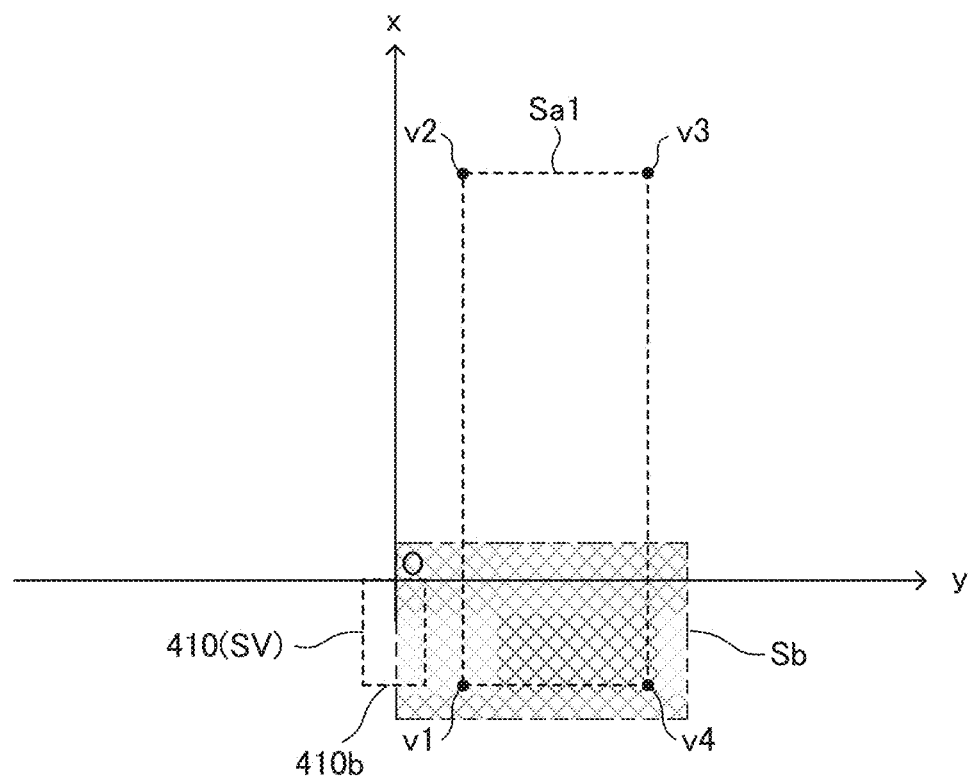
FIG. 18 is a view which shows another example of the first area.

The first area Sa1 is not limited to one described above. As shown in FIG. 18, the first area Sa1 may be set such that the first area Sa1 is at the turning direction side or the right side of the longitudinal direction line Ax of the own vehicle SV, i.e., the turning direction side of the right side of the x-axis and extends forward from near the own vehicle SV. In this case, the vertex v1 and the vertex v4 may be set at optional positions in an area Sb near the own vehicle SV, respectively. According to one or more embodiments, the x-coordinates of the vertex v1 and the vertex v4 may be negative values, respectively. Further, according to one or more embodiments, the values of the x-coordinates of the vertex v1 and the vertex v4 may be equal to a value of the x-coordinate of a rear end portion 410b of the first rectangle 410 of the own vehicle SV, respectively (see FIG. 18). Furthermore, according to one or more embodiments, the values of the x-coordinates of the vertex v1 and the vertex v4 may be smaller than the value of the x-coordinate of the rear end portion 410b, respectively. Furthermore, according to one or more embodiments, the value of the y-coordinate of the vertex v1 may be set to a positive value corresponding to a position away rightward from the first rectangle 410 of the own vehicle SV by a predetermined distance.

Modified Example 2

Further, the CPU may be configured to change the lengths Ly of the first area Sa1 and the second area Sa2, based on the lane information and/or the road information. For example, when the road has one traffic lane for each way, the CPU may be configured to set the lengths Ly to a length of one traffic lane. Further, when the road has two traffic lanes for each way, the CPU may be configured to set the lengths Ly to a length of two traffic lanes.

Modified Example 3

Further, the CPU may be configured to only determine whether the condition A1 is satisfied at the step 1708 of the routine shown in FIG. 17. With this configuration, the alert apparatus can further reduce the possibility of determining the approaching vehicle having the low probability of colliding with the own vehicle SV as the oncoming vehicle.

Modified Example 4

Furthermore, shapes of the first area Sa1 and the second area Sa2 may be shapes other than the rectangular shape, respectively. The shapes of the first area Sa1 and the second area Sa2 may be a polygonal shape such as a triangular shape or a rectangular shape or a round shape such as a circular shape or an oval shape.

Modified Example 5

Furthermore, the CPU may be configured to determine whether the own vehicle SV is going to turn right, based on information from the navigation ECU 50. In this case, the CPU may be configured to start executing the routines shown in FIG. 16 and FIG. 17 when the CPU determines that the own vehicle SV is approaching the traffic intersection or the own vehicle SV is moving in a right-turn-only lane, based on the information from the navigation ECU 50.

Modified Example 6

Furthermore, in the embodiments described above, the examples for countries and regions which regulate the vehicles to keep to the left side of the road. However, the alert apparatus can be applied to countries and regions which regulate the vehicles to keep to the right side of the road.

What is claimed is:

1. An alert apparatus, comprising:
at least one sensor which acquires object information on objects in a surrounding area around an own vehicle, the surrounding area including a forward area ahead of the own vehicle; and
an electronic control unit which is configured to:
when the own vehicle turns at a traffic intersection, select another vehicle as an approaching vehicle, based on the object information, the other vehicle being a vehicle which is in the surrounding area and moves toward the own vehicle; and
when the electronic control unit determines that the approaching vehicle is an oncoming vehicle which has a probability of colliding with the own vehicle, execute an alert control of alerting a driver of the own vehicle about the oncoming vehicle which has the probability of colliding with the own vehicle,
wherein the electronic control unit is configured to:
set a determination area used to determine whether the approaching vehicle is the oncoming vehicle; and
determine that the approaching vehicle is the oncoming vehicle when any one of (i) a first condition that a particular position of the approaching vehicle is in the determination area and (ii) a second condition that a predicted moving route of the approaching vehicle crosses the determination area, is satisfied, and
wherein the electronic control unit is configured to:
set the determination area such that the determination area is at a turning direction side of the own vehicle with respect to a longitudinal direction line of the own vehicle and extends forward from the own vehicle or from near the own vehicle when an angle condition that a moving direction angle corresponding to an angle defined by the longitudinal direction line of the own vehicle and a moving direction of the approaching vehicle is within a predetermined angle range, is satisfied; and
when the angle condition is not satisfied, set the determination area such that the determination area is at the turning direction side of the longitudinal direction line and away forward from the own vehicle by a predetermined distance.

2. The alert apparatus as set forth in claim 1,
wherein the electronic control unit is configured to:
in a first situation that the approaching vehicle is at the opposite side to the turning direction side of the own vehicle with respect to the longitudinal direction line of the own vehicle, determine that the angle condition is satisfied when the moving direction angle is within a first angle range; and
in a second situation that the approaching vehicle is at the turning direction side of the own vehicle with respect to the longitudinal direction line of the own vehicle, determine that the angle condition is satisfied when the moving direction angle is within a second angle range, and
wherein the first angle range is greater than the second angle range.

* * * * *